(No Model.)
N. S. ACKERLY.
ELEVATOR BUCKET.
No. 288,197. Patented Nov. 13, 1883.
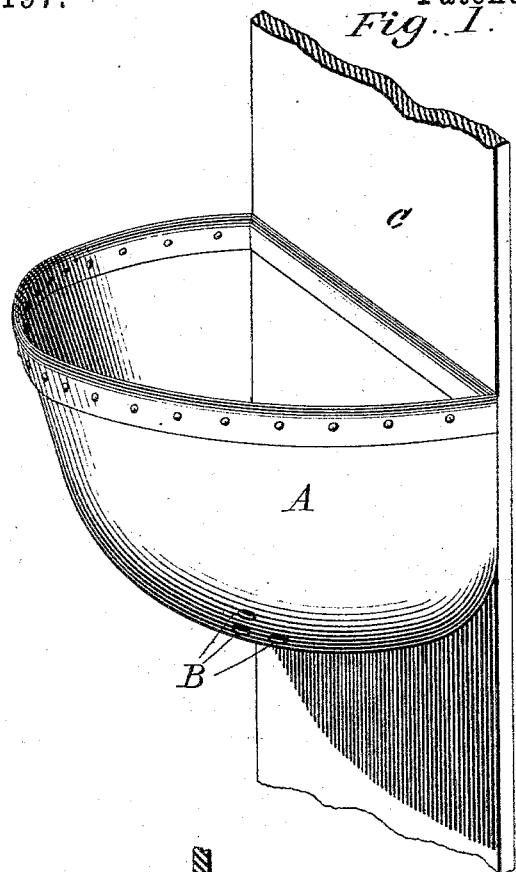
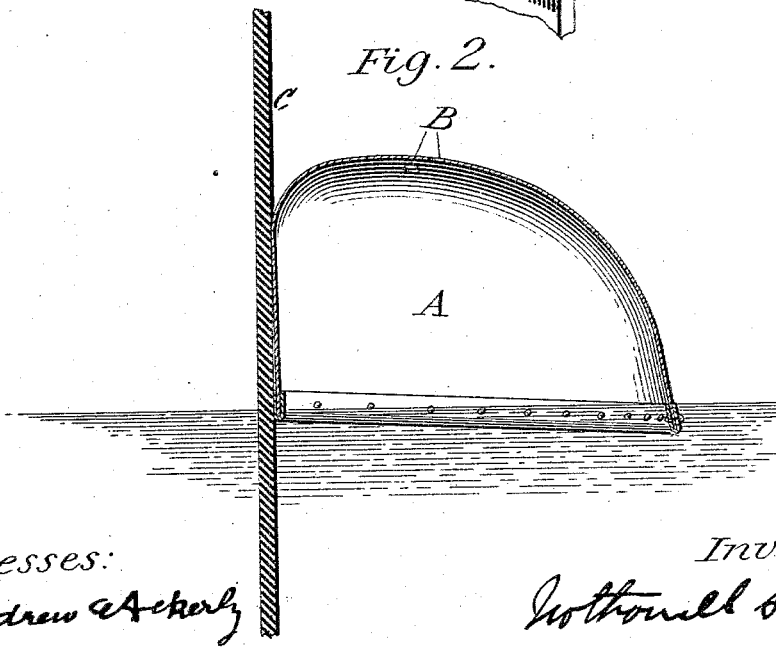
Witnesses:
Andrew Ackerly
Rowland Miles
Inventor:
Nothwell Ackerly

United States Patent Office.

NATHANIEL S. ACKERLY, OF HUNTINGTON, NEW YORK.

ELEVATOR-BUCKET.

SPECIFICATION forming part of Letters Patent No. 288,197, dated November 13, 1883.

Application filed August 16, 1883. (No model.)

*To all whom it may concern:*

Be it known that I, NATHANIEL S. ACKERLY, a resident of the town of Huntington, county of Suffolk, State of New York, have invented a new and useful Improvement in Elevator-Buckets, of which the following is a specification.

My invention relates to an improvement in elevator-buckets.

In the accompanying drawings, Figure 1 represents a perspective view, and Fig. 2 an inverted view, of the bucket.

A represents the bucket; C, the belt or chain on which it is fastened, and B the apertures or holes in the front part of the bucket.

Previous to my invention elevator-buckets used on belts or chains for taking up wet sand and gravel or similar substances would retain a part of the material and carry it back, also, when driven in the water, required much power to drive the air out of the bucket. I overcome this by putting one or more holes in the front of the bucket.

What I claim as my invention, and desire to secure by Letters Patent, is—

Elevator-buckets of any kind or shape, provided with one or more apertures, and adapted to be attached to a belt or chain and used for elevating sand, gravel, or soil and gravel, and grit and like substances, when the material is wet or when it is taken up out of the water, thus allowing the air to enter back of the material in the bucket, so it will dump out of the bucket, and allowing the air to escape as the bucket enters the water.

In testimony that I claim the foregoing as my invention I have signed my name, in presence of two witnesses, this 17th day of July, 1883.

NATHANIEL S. ACKERLY.

Witnesses:
FRANCIS B. OLMSTED,
WILLIAM M. OLMSTED.